United States Patent [19]

Raynor et al.

[11] 3,893,564
[45] July 8, 1975

[54] ARTICLE CARRIER AND DRIVE MEANS THEREFOR

[75] Inventors: Warren S. Raynor, Port Hope; Jacob Hermans, Cobourg, both of Canada

[73] Assignee: Rexnord Incorporated, Milwaukee, Wis.

[22] Filed: Mar. 7, 1974

[21] Appl. No.: 449,169

Related U.S. Application Data

[63] Continuation of Ser. No. 308,891, Nov. 22, 1972, abandoned.

[52] U.S. Cl. .................................. 198/189; 198/195
[51] Int. Cl. ............................................ B65g 17/00
[58] Field of Search ........ 104/25; 198/189, 181, 195

[56] References Cited
UNITED STATES PATENTS

| | | | |
|---|---|---|---|
| 3,379,300 | 4/1968 | Karr | 198/181 |
| 3,498,445 | 3/1970 | Piper | 198/181 |
| 3,730,331 | 5/1973 | Goldberg | 198/189 |

*Primary Examiner*—Richard A. Schacher
*Attorney, Agent, or Firm*—Sughrue, Rothwell, Mion, Zinn & Macpeak

[57] ABSTRACT

The pallets of an endless conveyor are interconnected by links which include rollers operating between spaced guides. The conveyor is driven by drive blocks carried by and between parallel endless drive chains to engage each link above the rollers. The roller guides are continuous excepting only where the upward and downward path of the drive blocks intersects the horizontal path of the rollers.

7 Claims, 8 Drawing Figures

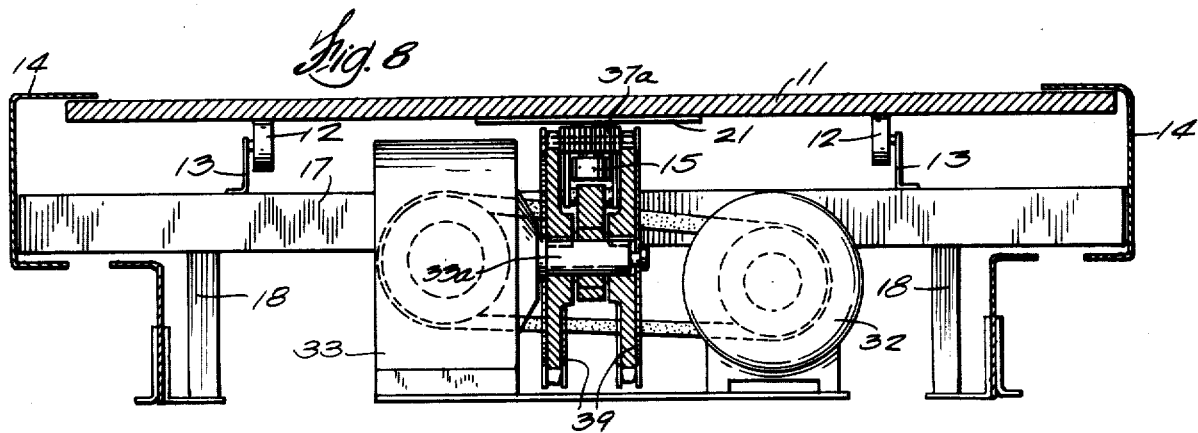
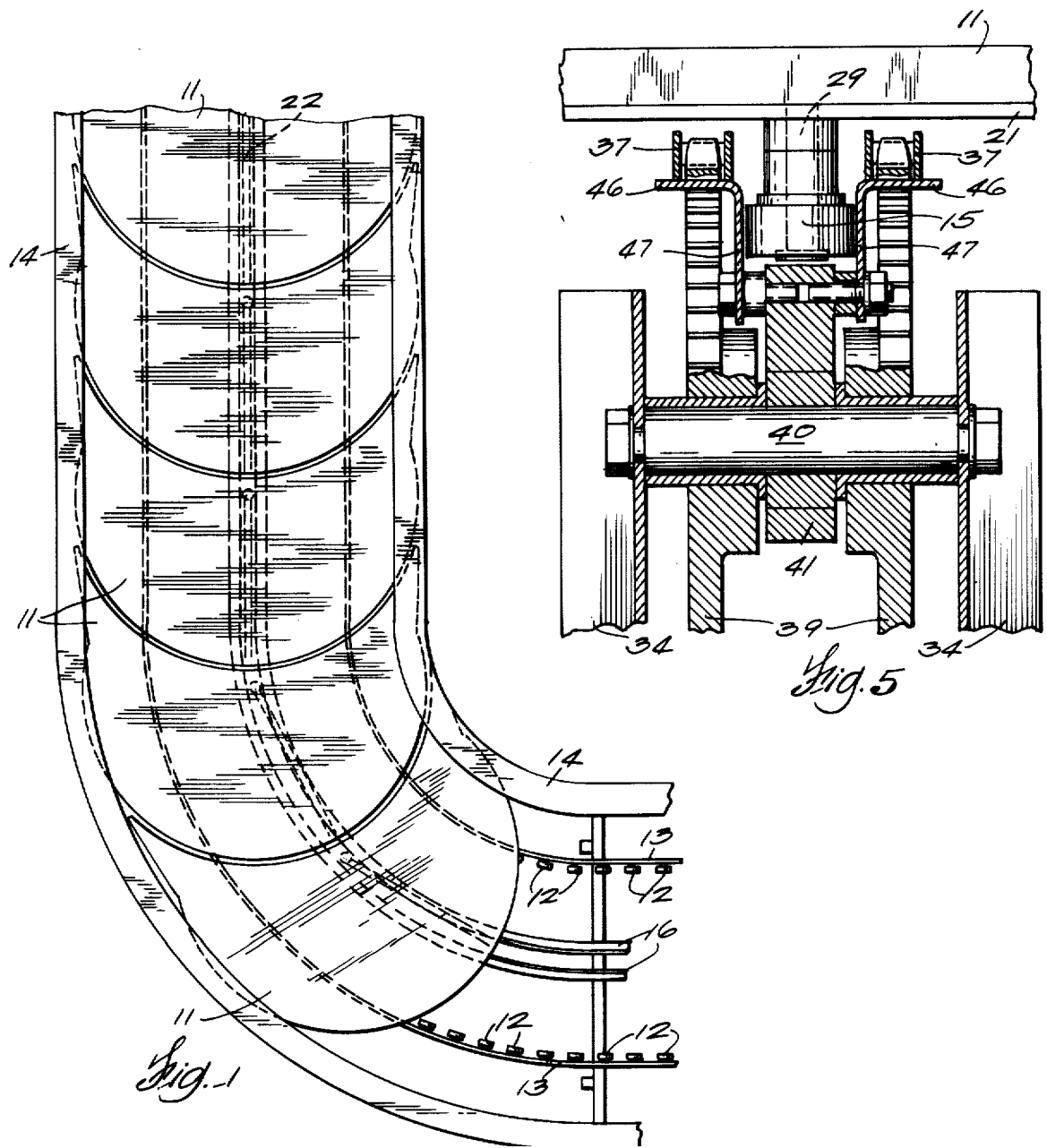

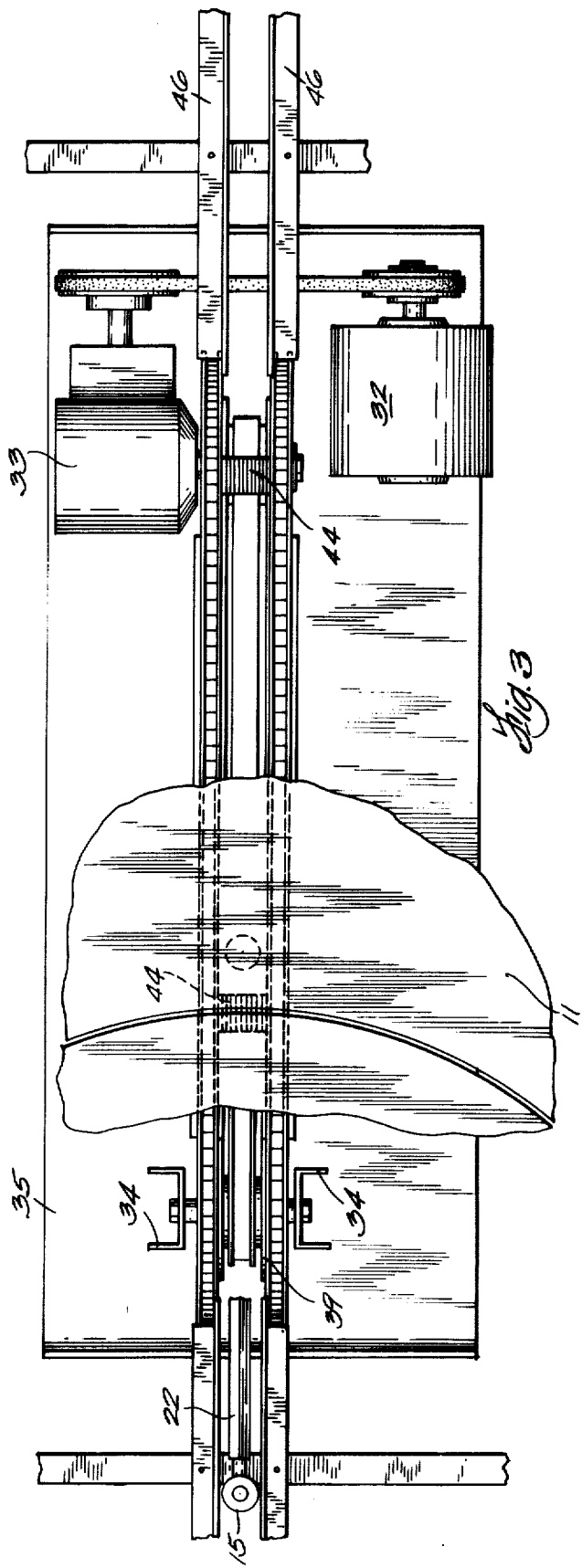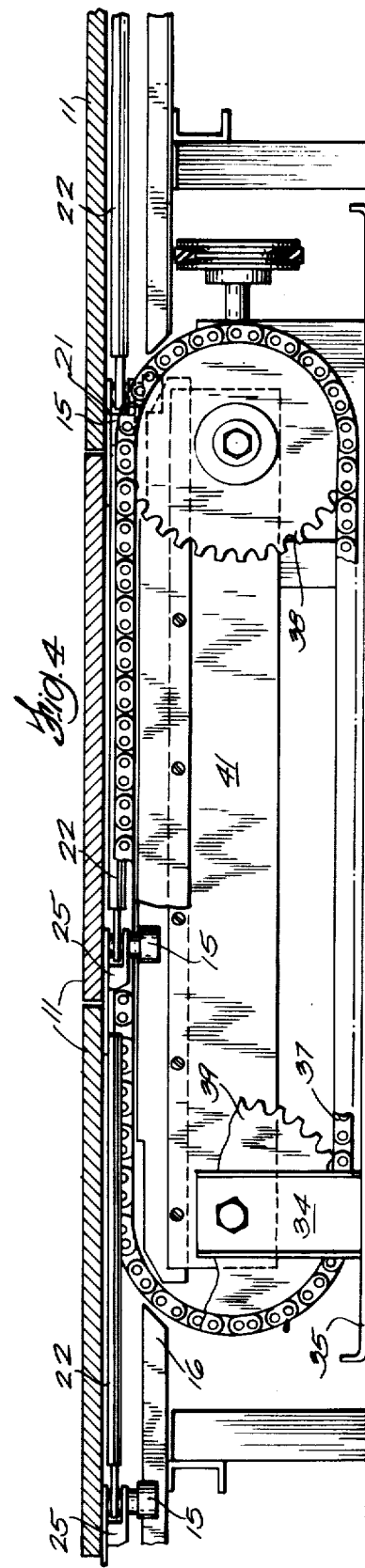

3,893,564

ARTICLE CARRIER AND DRIVE MEANS THEREFOR

This is a continuation of application Ser. No. 308,891, filed Nov. 22, 1972, now abandoned.

BACKGROUND OF THE INVENTION

1. The field of the invention includes article conveyors and particularly crescent-shaped plate-type carriers for operation generally in a horizontal plane.

2. Prior art conveyors and the endless drives therefor have been constructed so that the upper carrying surface of the conveyor must often be too great a distance above the floor unless the installation allows the lower part of the drive to be recessed in the floor. The recess is expensive and forms a trap for dirt and watter and especially complicates access to and removal of the drive when required. The distance referred to may be less than one foot but one or two inches may be critical where, for example, the conveyor is a luggage handling conveyor.

SUMMARY OF THE INVENTION

The drive of the conveyor comprises laterally spaced parallel chains which operate over paired sprockets and carry drive blocks therebetween at spaced intervals.

Each connecting link comprises a flat plate which carries a bearing block and is fixed to the underside of the respective pallet, and a rod having one end fixed to the plate near the bearing block of the next link. The bearing block and the end of the rod of each link are spaced to allow a drive block therebetween to engage the bearing block. The guide roller of each link is carried by and below the bearing block and operates between spaced guides excepting only where the guide roller passes between the chains at two locations below the upper run of the chains extending alongside the rods. In this manner, only the width or thickness of the plate determines the required elevation of the pallets above the drive.

BRIEF DESCRIPTION OF THE DRAWINGS

FIG. 1 is a plan of a section of the conveyor.

FIG. 3 is an enlarged plan of the drive section of the conveyor with parts of the links and pallets broken away and sectioned.

FIG. 4 is a side elevation of the drive section shown in FIG. 3.

FIG. 5 is an enlarged section taken on the axis of the sprocket at the left of FIG. 4.

FIG. 8 is a transverse sectional view of the conveyor.

DESCRIPTION OF THE PREFERRED EMBODIMENT

Figure 2:
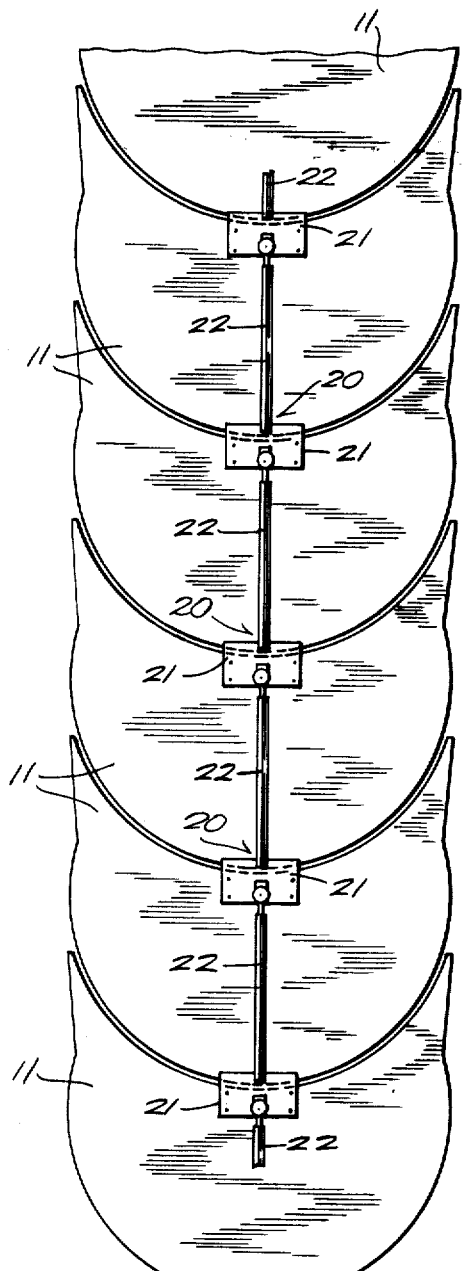
FIG. 2 is a view of the underside of several pallets and connecting links.
Figure 6:
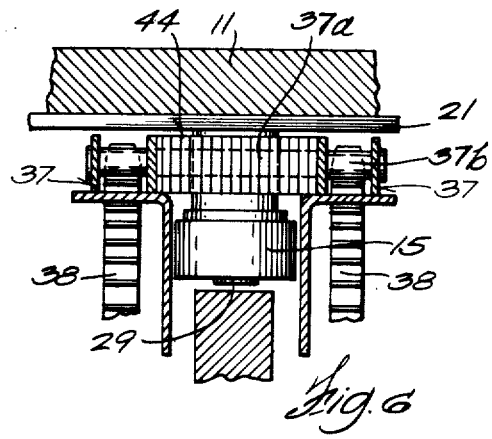
FIG. 6 is an enlarged section of part of the drive shown in FIG. 5.
Figure 7:
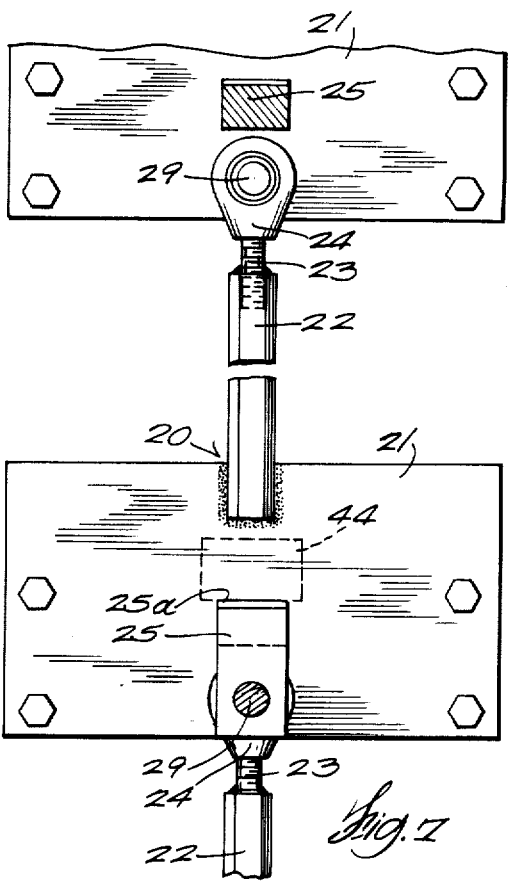
FIG. 7 is a further enlarged view of parts of the underside of the connecting links of FIG. 2.

The conveyor shown in part in FIG. 1 includes the series of crescent-shaped pallets 11 which are supported for movement by the spaced parallel series of rollers 12 carried by the longitudinal members 13. However, the centerline of the pallets is shown offset such that the corners of the pallets are exposed at the outside of the curve. The centerline should be such that the upper ledges of the guards 14 overhang both sides of the pallets so that the corners are not so exposed. Each pallet 11 is guided laterally between the outer guards 14 by a roller 15 which operates between the two spaced parallel guides 16 at the centerline of the conveyor. Guides 16 may comprise the two sides of a channel, not shown, or separate members as shown. The members 13, guards 14 and guides 16 are supported at intervals by the cross-members 17 having downward legs 18 which may be attached to the floor of the installation where required.

Each of the links 20 connecting pallets 11 includes a flat plate or plate portion 21 secured or bolted to the underside of the respective pallet and a rigid connecting rod 22. One end of the rod is welded to the plate and the other end is threaded to receive the threaded shank 23 of a ball and socket type rod end bearing 24 the rod 22 and shank 23 are considered a rod portion of the entire link. The ball of bearing 24 fits in the clevis formed by the plate 21 and a forward projection of the bearing block 25 which is welded to the underside of the plate a certain minimum distance from the end of rod 22. In the manufacture of each link, each bearing block 25 is welded to a plate 21 and the block and plate are then drilled to provide aligned holes to receive the stud or post 29. During or upon assembly of the links, threaded shank 23 is secured with welds in the threaded end of rod 22 to prevent any subsequent rotation of either relative to the other.

The roller 15, referred to previously, is rotatably mounted on the lower end of the stud or post 29 which extends upwardly through the hole in the projecting end of block 25, the mounting hole of the ball of the bearing 24 and the corresponding hole provided in plate 21. The post 29 may be variously secured to provide the connection and allow readily the disconnection of adjacent links as may be required.

Pallets 11 and links 20 form an endless loop which is moved in a closed path by the drive unit located below one section of the loop. The drive unit includes the drive motor 32, the reducer 33 driven by the motor, and the upright brackets 34 all of which are mounted directly on the base plate 35. Alternatively, the motor and reducer and brackets may be mounted or secured directly to the floor.

The spaced parallel drive chains 37 operate over the spaced pairs of drive and driven sprockets 38 and 39, respectively mounted on the output shaft 33a of reducer 33 and turnable on the fixed shaft 40 extending between brackets 34. The two shafts 33a and 40 are firmly spaced by the bar 41 disposed between the shafts. For that purpose, bar 41 is provided with a bearing at one end in which shaft 33a is turnable and a bore at the other end in which shaft 40 is fixed.

The drive unit is disposed so that the upper runs of chains 37 pass directly under the plates 21 and the rods 22, rod ends 24 and bearing blocks 25 pass directly between the upper runs of the chains.

The minimum distance between the end of rod 22 and the rearward face 25a of bearing block 25 of each link accommodates the drive blocks or members 44 carried by and between chains 37 at equally spaced intervals which are, of course, equal to the intervals between faces 25a of the links of the conveyor loop. Various manufacturing expedients for the adjustment of the distance between faces 25a of the links may be resorted to.

The drive blocks 44 may be of any construction. As shown, they comprise a number of pin plates 37a which are identical with those of chains 37 and are assembled on pins 37b extending between and join the chains.

The upper runs of chains 37 are supported or slide on the spaced support plates 46 which extend between the sprockets and are formed integrally with the spaced vertical plates 47 which are bolted to the opposite sides of bar 41. Plates 47 provide the guidance of rollers 15 as they pass through the drive section of the conveyor.

The adjacent corresponding ends of guides 16 and plates 47 are, of course, spaced where the path of the drive blocks 44 intersects the path of the rollers. The exact spacing of chains 37, as shown, is only slightly greater than the spacing of guides 16 and guide plates 47 so that the chains complete the uninterrupted guidance of the rollers throughout the closed loop of the conveyor.

Removal of a post 29 allows the separated pallets to be shifted from under the guards 14 and the section of the conveyor over the drive unit may then be laterally displaced to make the drive unit accessible for servicing.

Base plate 35 is suitably secured in position beneath the driven section of the conveyor and between the ends of guides 16 so that it may also be conveniently removed when necessary. For that purpose, upon removing a section of the guard 14 at one side of the drive, the conveyor may be lifted slightly and after removal also of a section of the support members 13, the entire drive unit mounted on base plate 35 may be moved laterally from beneath the conveyor. Where the motor 32, reducer 33 and brackets 34 are alternatively secured directly to the floor, the motor may be removed separately and, similarly, the drive unit including reducer 33 and brackets 34 may be removed separately of the motor.

We claim:

1. A horizontal conveyor comprising an endless series of roller-supported pallets having interconnecting links and a drive system therefor, each link comprising a plate attached to the underside of a pallet, a rod and first and second members which are pivotally interconnected for relative rotation on a vertical axis, the first member being attached to the plate extending downwardly therefrom and the second member being joined to one end of said rod, the other end of said rod being attached to the underside of said plate whereby said links and pallets are interconnected to form a closed loop, said drive system comprising a driven member attached to the underside of each plate and disposed intermediate said links, a series of drive members adapted to engage successive driven members, a pair of drive chains, said series of drive members being disposed between and carried by said chains, and a spaced pair of drive sprockets over which said chains operate; said chains and sprockets being disposed and spaced laterally to allow the driven members and links to pass between said chains and sprockets, the adjacent links and the intermediate driven members being spaced in the loop direction to allow a drive member to engage the driven member in the horizontal plane immediately below said plate whereby the movement of the chains drives the links and pallets in said closed loop.

2. The conveyor of claim 1 wherein each first member comprises a pin extending downwardly through and below the second member and which further includes a roller turnable on the lower end of each such pin and parallel guides for the rollers of the conveyor, said guides including separate sections which are spaced to allow the drive members to intersect the path of the rollers.

3. A horizontal conveyor comprising an endless series of roller-supported pallets having interconnecting links and a drive system therefor, each link comprising a rod and first and second members which are pivotally interconnected for relative rotation on a vertical axis, a series of drive members adapted to engage successive driven members, a pair of drive chains, said series of drive members being carried by and between said chains, and a spaced pair of drive sprockets over which said chains operate; said chains and sprockets being disposed and spaced laterally to allow the driven members and links to pass between said chain sprockets, the adjacent links and the intermediate driven member being spaced in the loop direction to allow a drive member to engage the driven member in the horizontal plane of the links whereby the movement of the chains drives the links and pallets in a closed loop, a guide roller depending from below each link, a stationary guide track with a pair of spaced apart guide elements guiding the roller in a horizontal path, which path is open at the position of the drive chains, and further spaced guide plates between the drive chains for guiding the roller between the drive chains.

4. In combination with a conveyor comprising a series of pallets disposed in a closed horizontal loop and guide means therefor, each pallet having a downwardly extending pin, a downwardly extending driven member and a rod having one end secured to the underside of said pallet and extending horizontally beneath the next adjacent pallet of the closed loop, the other end of said rod being pivotally turnable on said pin, the pin extending downward and having a roller cooperating with said guide means for guiding the pallets; drive means including horizontally spaced pairs of sprockets, a spaced pair of drive chains operating over said sprockets and having a series of drive members carried thereby and therebetween, said drive chains and members being disposed and spaced so that the rods and driven members pass between the upper runs of the chains as the drive members successively engage driven members to propel the conveyor, a frame supporting said pallets, a base supporting said drive means, said guide means comprising spaced parallel guides defining therebetween the closed loop of the conveyor, said guides including a section supported by said frame and a straight section supported by said base, the corresponding adjoining ends of said sections being only spaced to allow the drive members to intersect the path of the rollers.

5. The conveyor drive as in claim 4 further comprising horizontal supports positioned under an upper run of each drive chain for the chains to slide thereon.

6. A conveyor comprising a series of roller supported pallets having interconnecting links and operating in a closed horizontal loop and a drive system therefor comprising a series of spaced drive members carried by and between drive chains operating in closed parallel vertical loops, each link including a plate portion secured to the underside of the pallet, a first aperture in the plate portion, a pin receiving portion rigid with the plate portion and having a second pin receiving aperture aligned with the first aperture, a rod portion having one end rigid with the plate portion, a bearing carried by the other end of the rod portion, a pin received in the apertures and extending through the bearing for connecting the links together, the pin extending downward between the drive chains and cooperating with guide means for guiding the pallets, said drive chains being spaced to allow the rod portions and pin receiving portions to pass between the upper runs of the chains, the underside of each link being shaped to allow one of the drive members to engage and drive the same, each plate portion being fixed to the underside of a pallet whereby the movement of the chains drives the links and the pallets in a closed loop.

7. An endless horizontally disposed conveyor comprising a series of pallets supported by rollers and guided in a closed horizontal loop, the pallets being pivotably interconnected on vertical axes, each pallet having a downwardly extending driven member, a spaced pair of drive chains trained over sprockets having horizontal axes, a plurality of drive members carried by and between the chains, the drive members shaped for successive driving cooperation with the driven member extending downwardly from each pallet, the chains being disposed so that the downwardly extending member from each pallet successively extends downwardly into the space between the chains during driving movement of the chains, each pallet including a depending guide roller on a vertical axis, a stationary guide track for guiding the roller and the pallets in the closed horizontal loop except in the area of the drive chains, and further spaced guide plates between the drive chains to provide uninterrupted guidance of the rollers throughout the closed horizontal loop.

* * * * *